May 7, 1957  L. G. S. WOOD ET AL  2,791,756
TARGET DOPPLER INDICATOR

Filed June 11, 1946  2 Sheets-Sheet 1

Inventors
LEON G. S. WOOD
PAUL B. SEBRING

By M. A. Hayes

Attorney

May 7, 1957  L. G. S. WOOD ET AL  2,791,756
TARGET DOPPLER INDICATOR
Filed June 11, 1946  2 Sheets-Sheet 2

Inventors
LEON G. S. WOOD
PAUL B. SEBRING

By M. O. Hayes
Attorney

United States Patent Office 2,791,756
Patented May 7, 1957

2,791,756

TARGET DOPPLER INDICATOR

Leon G. S. Wood, Wollaston, and Paul B. Sebring, Concord, Mass., assignors to the United States of America as represented by the Secretary of the Navy Application June 11, 1946, Serial No. 675,857

9 Claims. (Cl. 340—3)

This invention relates to an indicating apparatus for use with underwater sound echo ranging equipment and is particularly directed to a unit which will indicate motion of the target toward and away from a searching ship.

In the use of echo ranging equipment in sub-surface warfare it is quite usual for the operator to analyze an echo aurally to determine whether a target is stationary, approaching him, or moving in a direction away from the ship. The component of frequency shift is known as the target Doppler and various devices have been proposed which will register or indicate this factor so that it may be utilized in the attack. It is, of course, possible to examine the record of a standard range recorder and note thereon whether the echo trace is such as to indicate an opening or closing target range, but this record is not as valuable as an indication which can be examined instantly on reception of an echo.

The primary object of the present invention is to provide an electronic system which will translate frequency variation in a received underwater signal into a measurable electrical impulse.

Another object of the invention is to provide an instrument of this type in which only a portion of the received sound is permitted to enter the indicating device.

Other objects and advantages of the invention will become apparent from the following description, reference being had to the accompanying drawings, in which.

Figure 1:
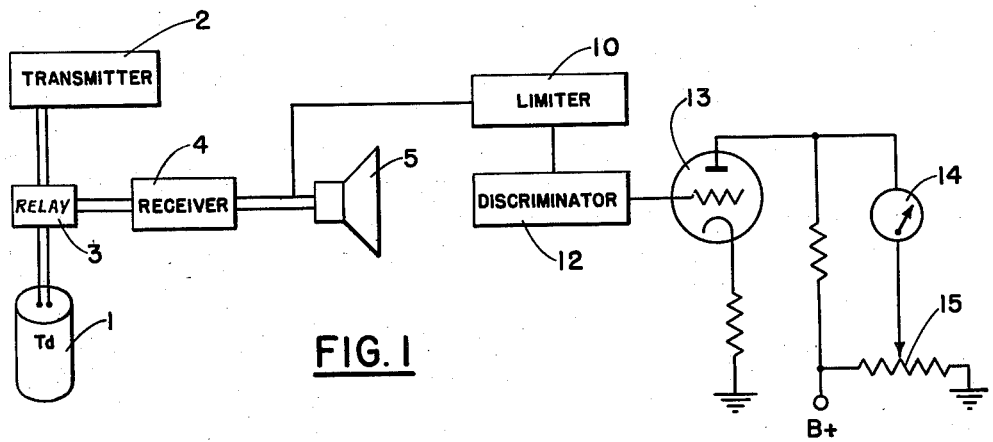
Fig. 1 is a block diagram of an echo ranging system with a simple indicating circuit.

In Fig. 1, the indicating device is shown in connection with an echo ranging system including a transducer 1 energized periodically by a transmitter 2 through a send-receive relay 3. The returning sounds which are changed by the transducer into electrical signals are taken through the relay 3 to a receiver 4 the output of which is normally fed to a suitable loudspeaker 5 at an audio frequency. According to the present invention a portion of the receiver output is taken to a limiter 10 which may be of two or three stages and operates in a conventional manner to eliminate substantially all amplitude modulation.

The output of the limiter 10 is taken to a discriminator 12 where frequency variations from a center frequency cause a D. C. voltage output. The discriminator may be of any suitable type or kind normally used for demodulation in frequency modulation radio receivers. The center frequency or zero indication is adjusted to coincide with the normal audio frequency output of the receiver 4 which, in currently used gear, is 800 cycles. If the device is connected to an intermediate frequency stage of the receiver it will, of course, be necessary to center the discriminator at the normal I. F. of the receiver. Certain advantages accrue from such a connection such as increased accuracy of indication, but for purposes of explanation, the adaptation to the audio frequency stage is used. Connected to the discriminator 12 is an indicator which is preferably a bridge-type D. C. amplifier including a triode 13 the grid of which is connected to the discriminator. An indicating meter 14 in the anode circuit is adjusted by means of a balancing potentiometer 15 to give a zero indication when the discriminator output is zero. When the discriminator output is negative, the indicator of the meter 14 moves in one direction and when the output is positive the meter indication is in the opposite direction. Any suitable center zero meter may be used for this purpose.

Figure 2:
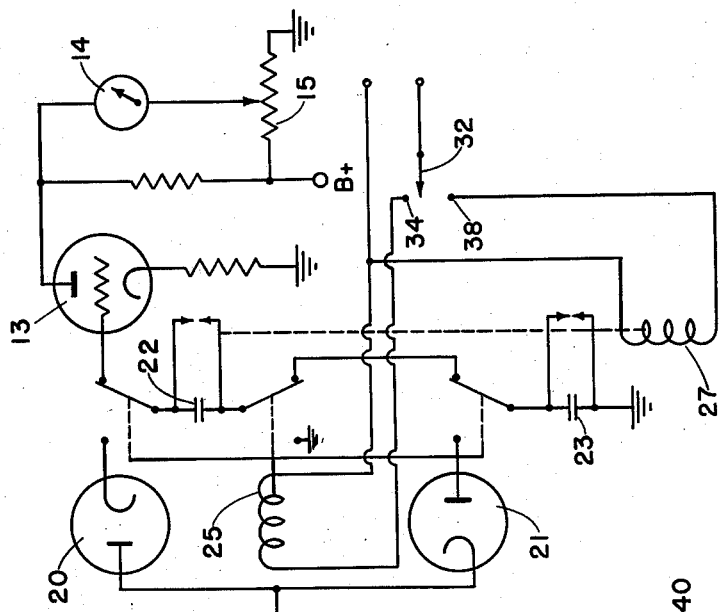
Fig. 2 is similar to Fig. 1, but with a range gate and indicating circuit provided.
Figure 2:
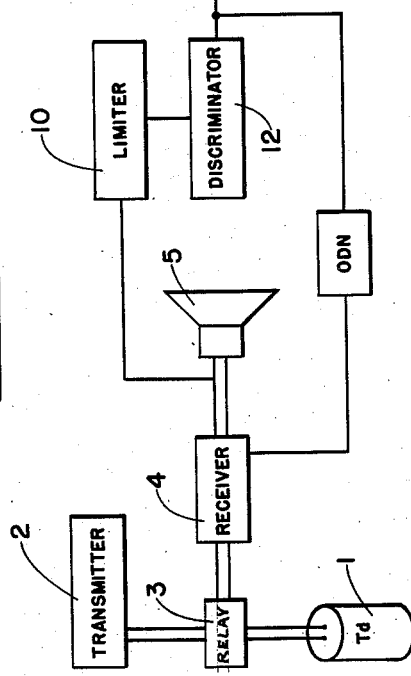

It is desirable that the indication which is due to the Doppler shifted echo be the only indication registered and that this indication be held continuously on the meter between pings of the transmitter 2. For this purpose a range gate may be provided as indicated in Figure 2. As there shown a pair of oppositely connected diodes 20, 21 are connected between the discriminator 12 and series connected capacitors 22 and 23. Each capacitor is connected to a relay swinger energized by a common solenoid 25.

When the solenoid 25 is energized the capacitors 22 and 23 are connected to respective diodes so that if the frequency departure is in one direction diode 20 will charge its associated capacitor 22, and if the departure is in the opposite direction diode 21 will charge capacitor 23. When the relay is again opened and the swingers return to their normal positions, capacitors 22 and 23 are connected in series and to the grid of the triode 13. The voltage on the capacitors is held on the grid until a time shortly before the next echo, at which time a second relay 27 is closed shorting and discharging the capacitors and clearing the system for the next echo.

Figure 3:
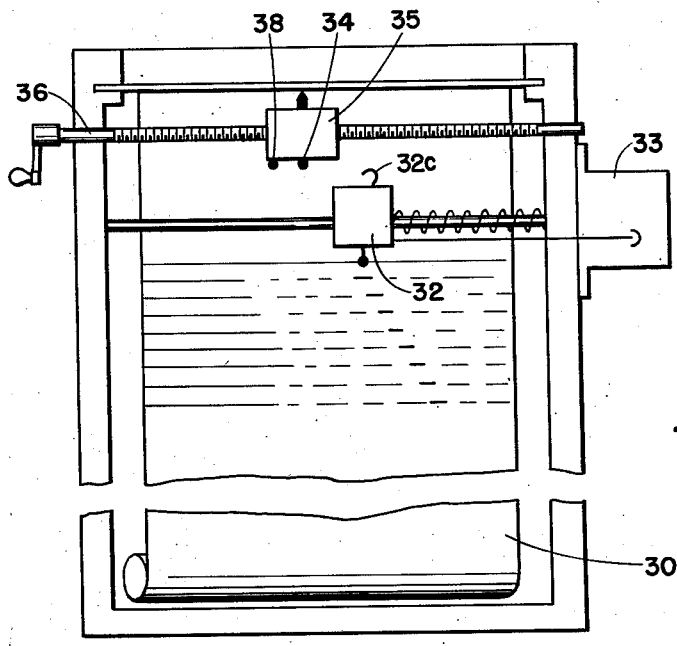
Fig. 3 is an exaggerated drawing of a standard range gate mechanism with added contacts for relay switching.

In Fig. 3 is a standard range recorder 30 of the type used in known echo ranging systems for obtaining range on the continuously-moving paper. In known systems, the drive motor (set at a rate determined by the pulse repetition frequency of the system) and the stylus clutch assembly 33 operate the stylus carriage 32 which moves along the X-axis recording the received echoes at the correct range. When the carriage 32 hits the range gate block 35, the stylus clutch disengages the motor from the shaft, and the stylus carriage snaps back to its origin. The recorder may be any of several known types of which an example is manufactured by the Sangamo Electric Company, Springfield, Illinois, and described in a publication of that manufacturer entitled "Instructions for Type CAN–55070 Range Recorder."

In my invention, any convenient means may be provided whereby the proper relay sequence is obtained. For example, the standard range recorder 30 of Fig. 3 may be modified by the inclusion of a contact 32c on the stylus carriage 32 which cooperates with a range gate contact 34, which is movable across the recorder face by any suitable mechanism such as a lead screw 36. As long as the contact on the stylus carriage 32 is closed against contact 34, the circuit to the relay solenoid 25 is complete. A short segment 38 carried by the range gate block 35 serves to close the contact 32c to the shorting and clearing relay 27.

The range gate shown in Figure 3 is exaggerated in the interest of clarity in that the contact 34 is of such length that many unwanted signals will pass through during the interval when its associated circuit is closed. In practice, the range gate is so arranged that the circuit can be closed only for a period corresponding to or appreciably less than the duration of an echo. For example, if a pulse length of .030 second is used, a range gate opening of .020 second, properly centered with respect to the echo, will give the truest indication, since the capacitors 22, 23 are then charged to the peak of the diode voltage and do not have an opportunity to discharge through this circuit prior to its interruption.

The system so far described presupposes that the output frequency of the receiver 4 is held constant. This may be done by manual adjustment, but it is more conveniently accomplished by inclusion of an "own Doppler nullifier." It will, of course, be understood that if the searching ship is moving and the transducer 1 trained in any but a beam direction, there is always present a Doppler shift in the received signal from the transmitted frequency. This shift is dependent on the speed of the searching vessel and the cosine of the angle at which the transducer 1 is trained. An electronic own Doppler nullifier is described in the copending application of Leon G. S. Wood, Ser. No. 547,919, filed August 3, 1944, now Patent No. 2,431,854 of December 2, 1947, and may be interposed at any suitable point in the system and is preferably obtained by sampling the signal in an intermediate frequency stage in the receiver 4 during the period of high reverberation following a ping. This element is labelled ODN in Figure 2.

Figure 4:
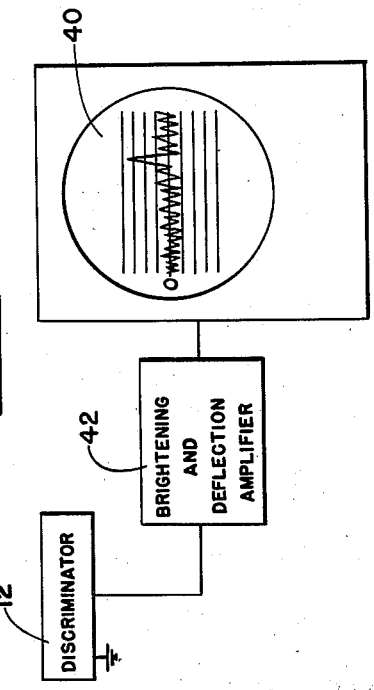
Fig. 4 is an alternate method of indication, showing cathode ray scope.

The indicating meter 14 may be conveniently replaced by a cathode ray indicator as indicated in Figure 4. As there shown, the screen of a cathode ray tube 40 is graduated in knots target Doppler. The circuit for the visual indicator unit includes the limiter and discriminator combination, the output of which is taken to a suitable deflection and brightening amplifier 42. The range gate may or may not be used with the visual indicator since the operator may, by studying the trace of the cathode ray tube, easily pick out the echo which is under study. The deflection of the cathode ray tube caused by normal reverberation seldom exceeds that caused by a frequency shift corresponding to about 1.5 knots target Doppler, and the majority of targets in which the operator will be interested have a Doppler shift greater than this value. Hence the Doppler shifted echo which the operator will study is characterized not only by its continual recurrence in approximately the same location on the face of the cathode ray tube but further by the fact that it has, in most instances, a greater and more uniform magnitude.

While the invention has been described in connection with simple circuits and indicating systems, various refinements will suggest themselves to those skilled in the art which will enhance the usefulness of the indication, such, for example, as the inter-position of a simple, relatively sharp filter between the limiter and discriminator circuits. It is not deemed necessary to describe such refinements nor to describe in detail the various modifications and changes which may be made in the invention without departing from its intended scope.

What we claim is:

1. In an echo ranging system, means for transmitting a signal on a known frequency and for receiving echo signals at frequencies other than the transmitted frequency, means converting said echo signals into signals of a corresponding frequency but with a constant amplitude, means to indicate a frequency shift in the last said signals as compared to the transmitted frequency, the last said means including a normally balanced discriminator which is unbalanced by passage of a signal of a frequency above or below that resulting from reception of an echo at the transmitted frequency, a triode having a control grid connected to the output of said discriminator, and a center-zero instrument connected to the output of said triode.

2. In an echo ranging system, means for transmitting a signal on a known frequency and for receiving echoes at frequencies other than the transmitted frequency, means to indicate a frequency shift in an echo including, means to limit the amplitude of the echo signal so as to have a constant magnitude, a discriminator, an amplifier connected to said discriminator, and a resistance bridge circuit connected to said amplifier, said bridge circuit being balanced at a predetermined output of said discriminator and having a visual indicator in one arm of the bridge.

3. In an echo ranging system having provision for transmitting sound wave trains on a known frequency and for receiving echo signals of such sound wave trains at frequencies other than the transmitted frequency, limiter means to bring to a constant amplitude all signals in a received wave train, discriminating means connected to said limiter to produce a voltage having a magnitude and sign dependent on the frequency of the signal passing through said limiter, gating means connected to said discriminating means to pass only a selected portion of the received wave train, and indicating means operated by said passed portion to indicate its frequency relative to the frequency of transmission, said gating means being connected to and controlling the discriminator output, said indicating means comprising an amplifier tube having a balanceable electric bridge circuit in its output and an indicator in an arm of the circuit.

4. Apparatus of a type described comprising a discriminator having a variable D. C. output responsive to frequency variations from a center frequency, a gating means comprising a pair of selectively conductive elements selectively operable by the output of said discriminator, oppositely chargeable capacitor means, switching means operable for connecting and disconnecting said capacitor means to and from said selectively conductive elements, an indicating means operable in accordance with the nature of the charge in said capacitor means, and control means for operating said switching means to selectively connect the capacitor means to said selectively conductive elements or to said indicating means.

5. Apparatus as defined in claim 4 but further characterized by another control means operable after said switching means connects said capacitor means to said indicating means for removing the charge from said capacitor means.

6. Apparatus as defined in claim 5 but further characterized by both of said control means having switch means for operation thereof, and means for selectively operating said switch means.

7. In an underwater sound echo ranging system carried by a moving ship, which functions by transmitting signals of sound wave trains and receiving echoes of such wave trains, means in said system to receive said echoes, means to eliminate a frequency shift of said received signals due to the motion of the ship, means to indicate a frequency shift in an echo due to motion of an echoing body, the last said means including a balanced electric circuit which is unbalanced by a frequency shifted signal, the last said means comprising limiting means to bring to a constant amplitude all signals in a received wave train including an echo, a discriminator through which said signals are passed, and an indicator operated by the discriminator output.

8. In an underwater sound echo ranging system carried by a moving ship, which functions by transmitting signals of sound wave trains and receiving echoes of such wave trains, means in said system to receive said echoes and convert them into corresponding electrical signals, means to eliminate a frequency shift of said received signals due to the motion of the ship, means to indicate a frequency shift in an echo due to motion of an echoing body, the last said means including a balanced electric circuit which is unbalanced by a frequency shifted signal, the last said means comprising limiting means to bring to a constant amplitude all signals in a received wave train including an echo, a discriminator to which said signals are passed, gating means connected to said discriminator, an amplifier connectible to said gating means, and an indicator connected to said amplifier.

9. An invention as defined in claim 8 but further characterized by said indicator being a center zero instrument.

References Cited in the file of this patent

UNITED STATES PATENTS

| | | |
|---|---|---|
| 1,864,638 | Chilowsky | June 28, 1932 |
| 2,268,587 | Guanella | Jan. 6, 1942 |
| 2,403,625 | Wolff | July 9, 1946 |
| 2,431,854 | Wood | Dec. 2, 1947 |
| 2,450,946 | Evans | Oct. 12, 1948 |
| 2,451,822 | Guanella | Oct. 19, 1948 |
| 2,479,568 | Hansen | Aug. 23, 1949 |
| 2,535,274 | Dicke | Dec. 26, 1950 |

OTHER REFERENCES

Terman: Radio Engineering, McGraw-Hill Book Co., 3rd Edition, 1947, pages 523–524. (Copy in Library.)